April 13, 1926.

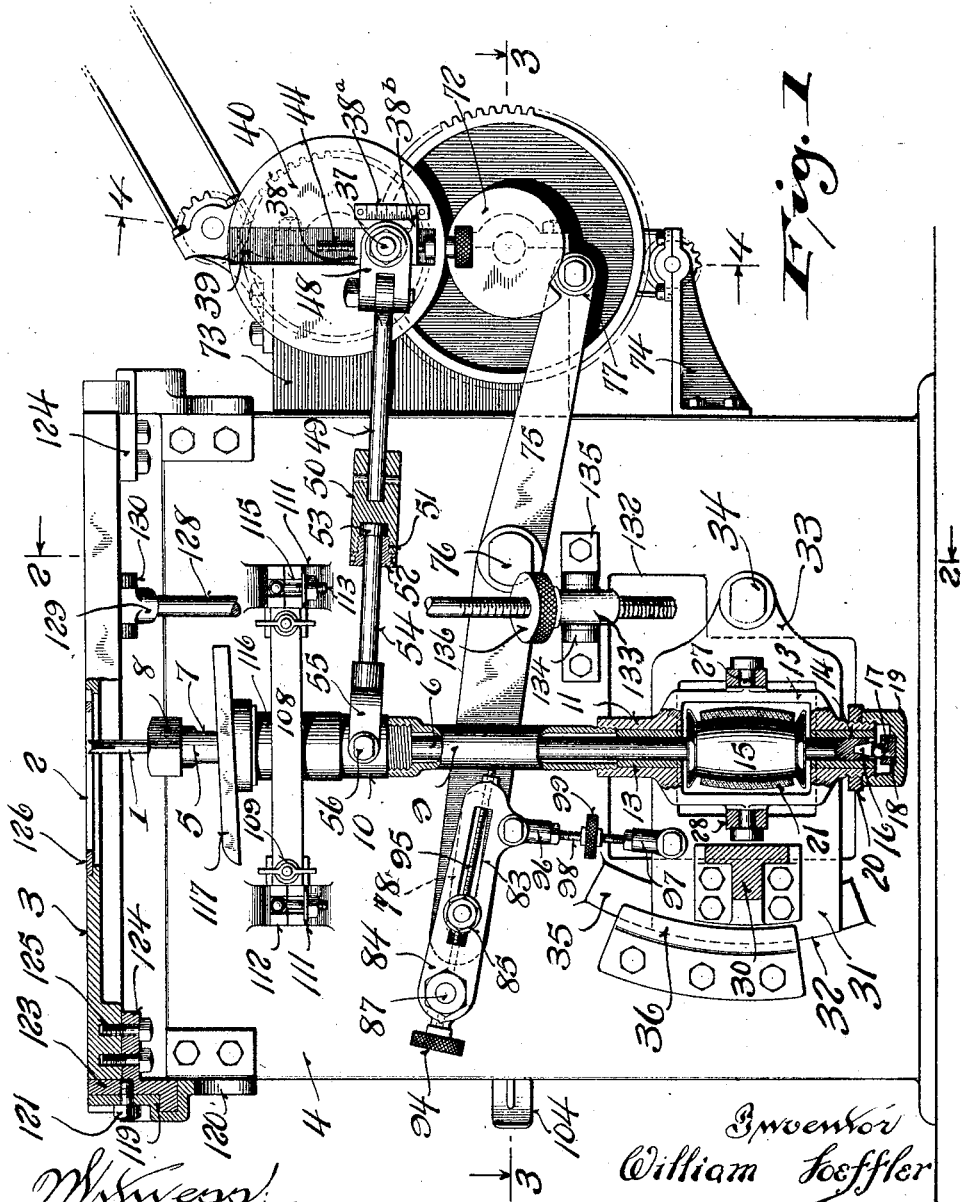

W. LOEFFLER 1,580,743

MORTISING MACHINE

Filed August 25, 1923   9 Sheets-Sheet 2

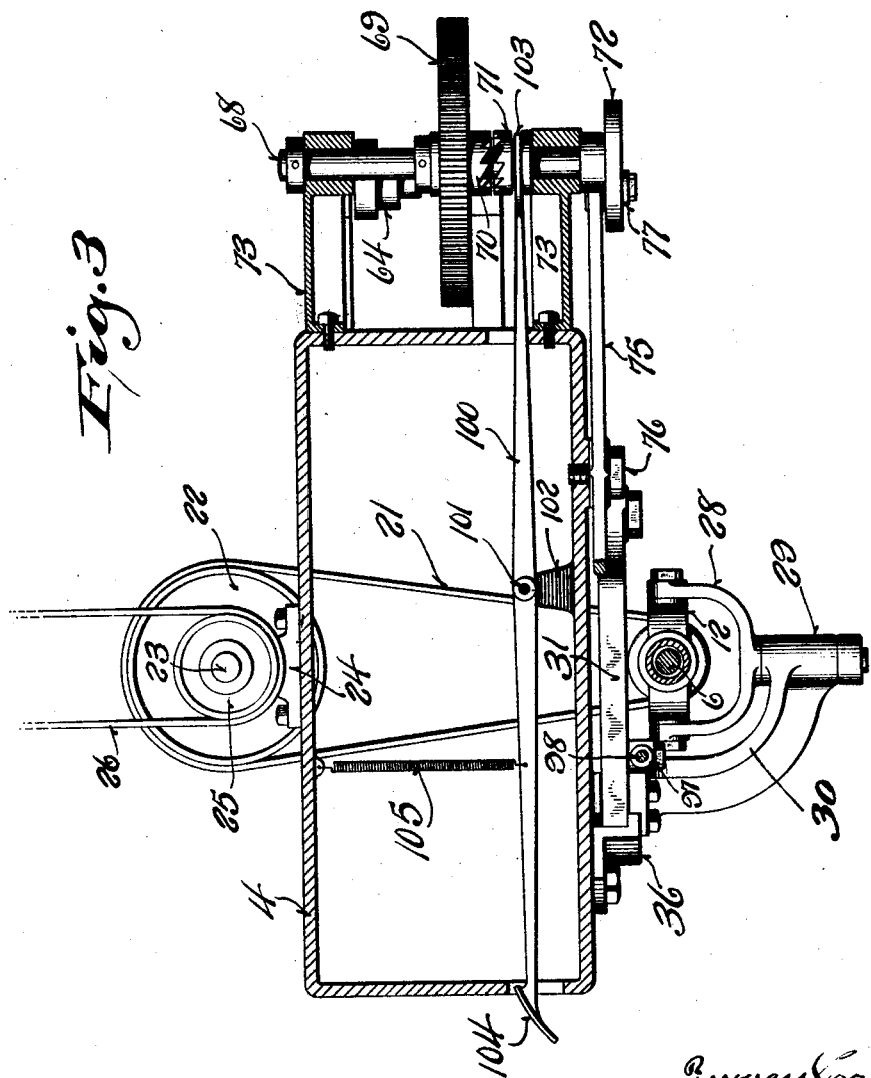

April 13, 1926.  
W. LOEFFLER  
MORTISING MACHINE  
Filed August 25, 1923  
1,580,743  
9 Sheets-Sheet 4

Witness  
R. E. Weber

Inventor  
William Loeffler  
By  
Attorneys

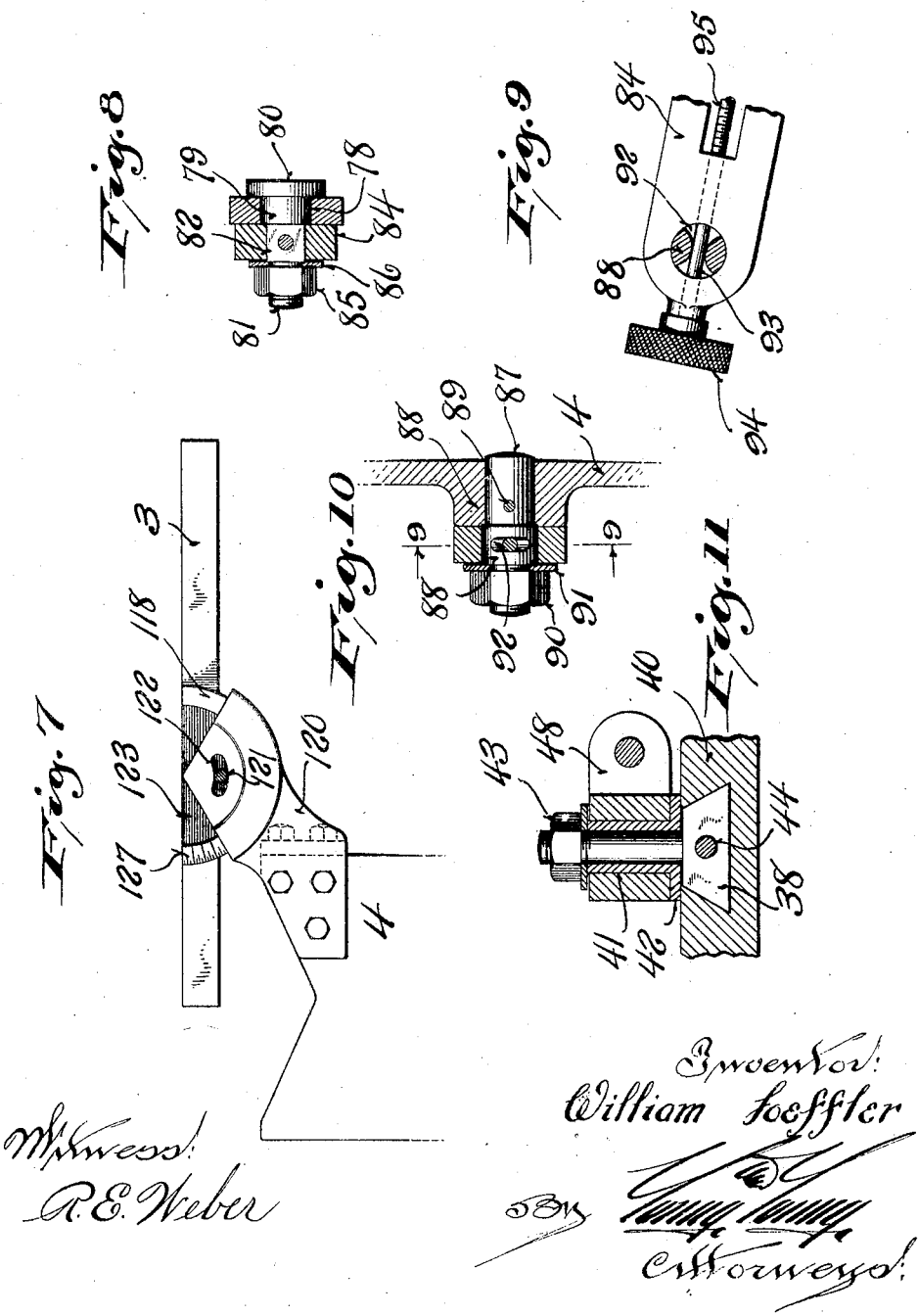

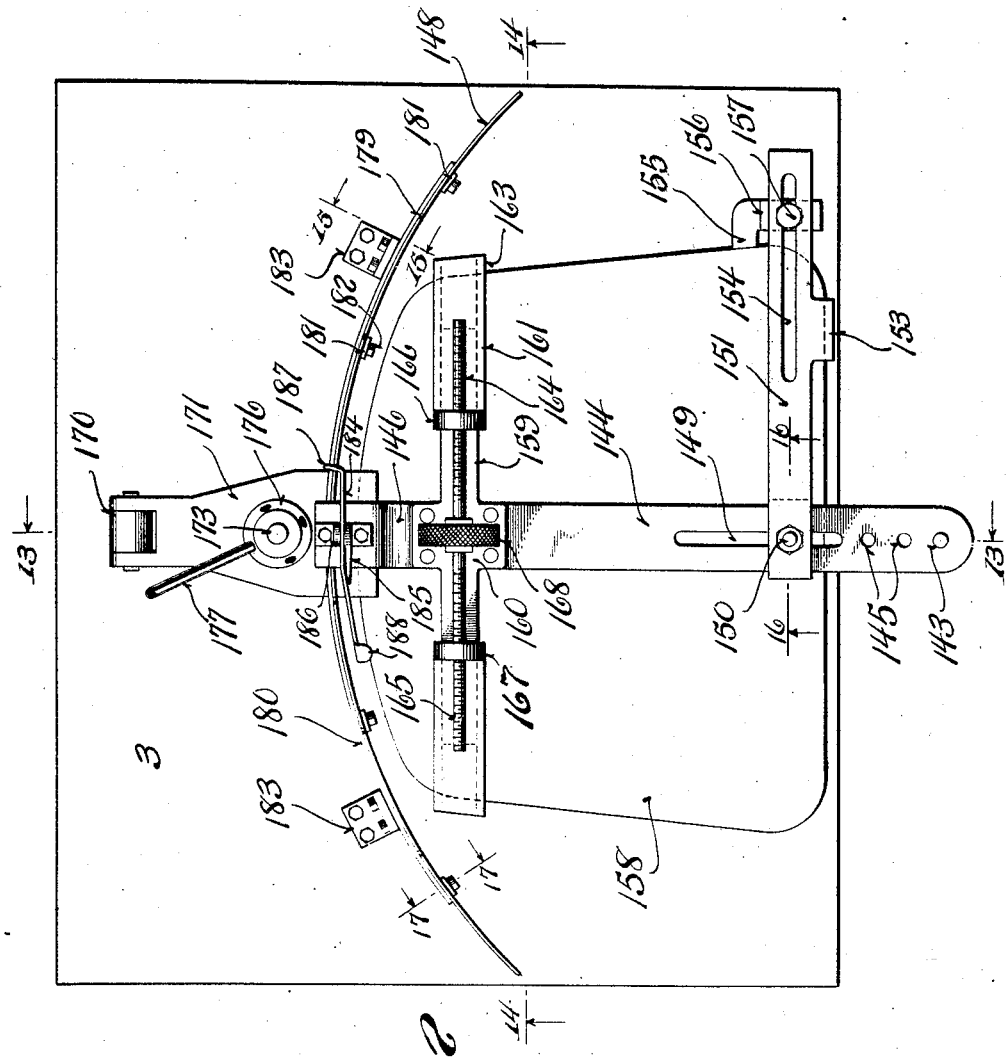

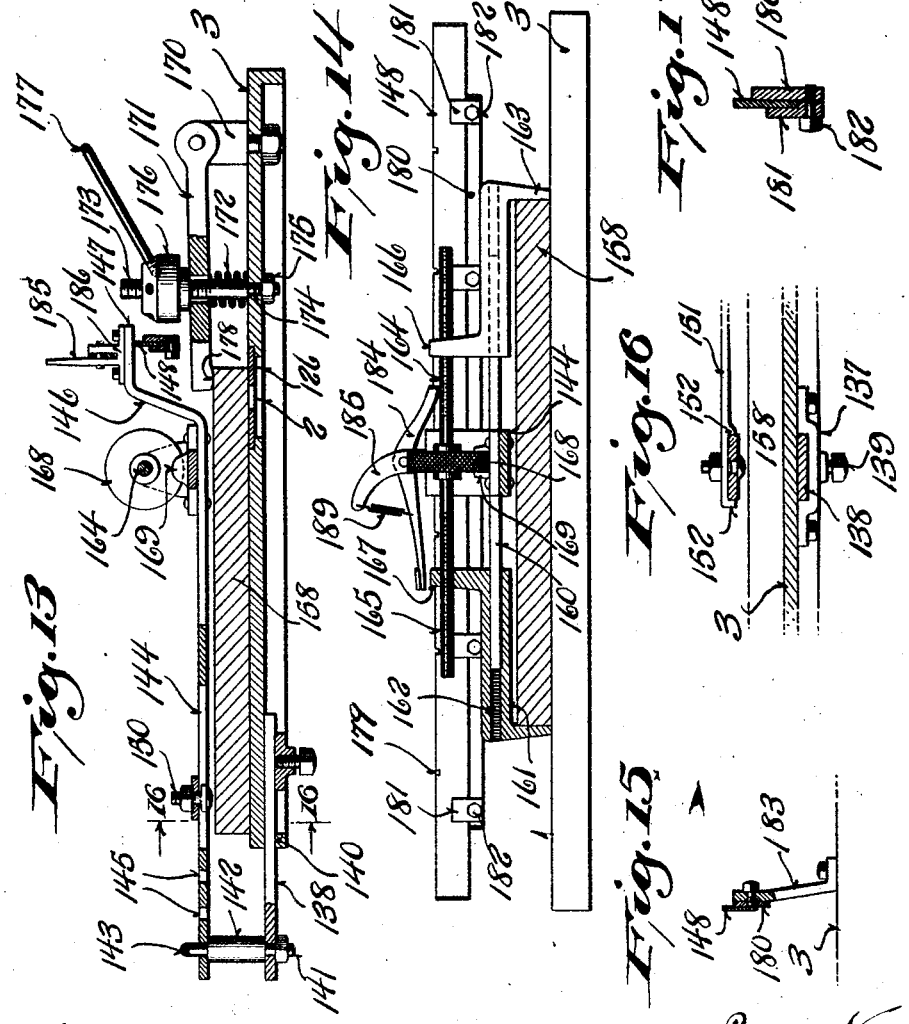

April 13, 1926.

W. LOEFFLER

MORTISING MACHINE

Filed August 25, 1923

Witness:
R. E. Weber

Inventor:
William Loeffler
By
Attorneys

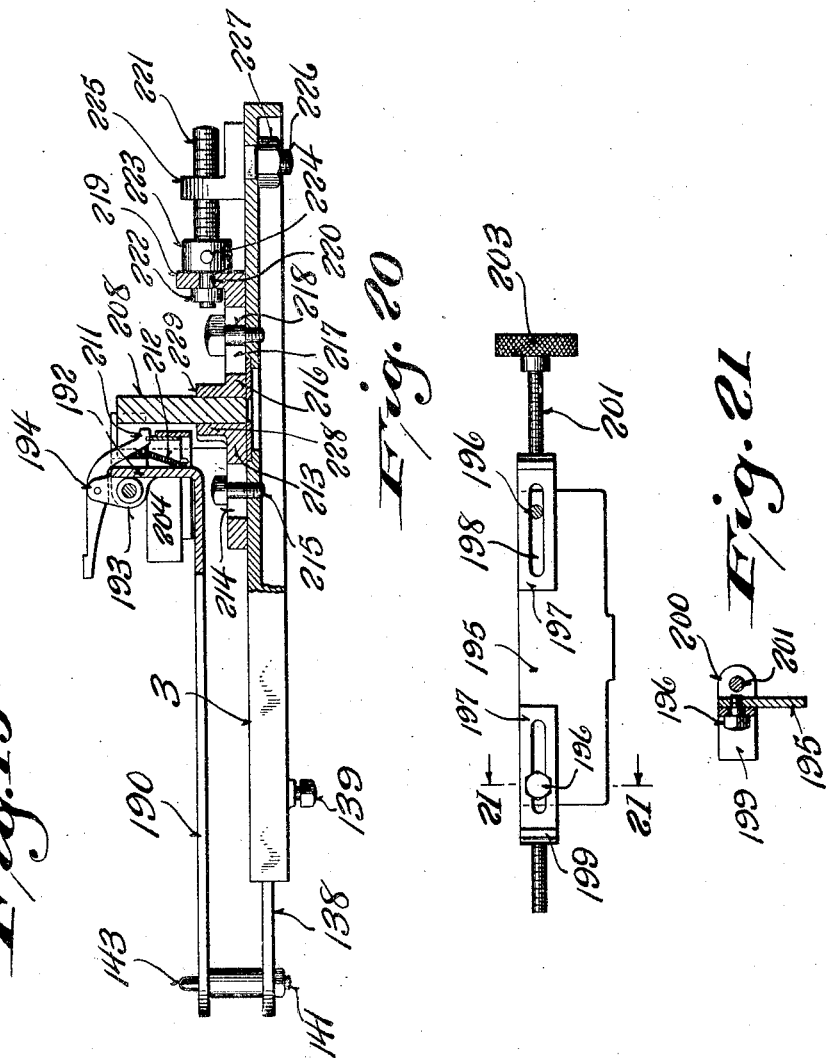

Patented Apr. 13, 1926.

1,580,743

UNITED STATES PATENT OFFICE.

WILLIAM LOEFFLER, OF SHEBOYGAN, WISCONSIN.

MORTISING MACHINE.

Application filed August 25, 1923. Serial No. 659,322.

*To all whom it may concern:*

Be it known that I, WILLIAM LOEFFLER, a citizen of the United States, and resident of Sheboygan, in the county of Sheboygan and State of Wisconsin, have invented certain new and useful Improvements in Mortising Machines; and I do hereby declare that the following is a full, clear, and exact description thereof.

This invention relates to mortising machines and is particularly directed to a power driven machine.

In mortising machines as heretofore constructed, difficulty has been experienced in providing a machine which will permit the rapid formation of a series of regularly spaced mortises, and which will form exactly similar mortises at each operation. Frequently these machines require the judgment of the operator for their correct manipulation, and consequently the successive mortises are not exactly alike but vary sufficiently to cause trouble where quantity production is attempted. In addition to this, the changing of work is a relatively slow process, and considerable time is therefore wasted.

This invention is designed to overcome the above noted defects, and to provide a mortising machine which will rapidly form identical mortises which will rapidly form a succession of regularly spaced mortises, and to provide a machine in which the work may be quickly and accurately clamped in position.

Further objects are to provide a mortising machine especially designed for quantity production; which will handle a large number of similar pieces of work in a short interval of time; which will utilize anyone of several guides or gauges for rapidly setting the work at several successive points, and to provide a machine which will automatically feed the tool into the work, and which will automatically stop when the mortise is complete, thereby dispensing with the judgment of the operator.

Further objects are to provide a machine which will cut a mortise of any desired contour, and which may be quickly adjusted to cut mortises of any desired depth, length, and at any angle.

Further objects are to provide a machine which is of sturdy and comparatively simple construction; which may be used by an unskilled operator, and which employs a relatively small number of parts.

Although the invention is described primarily as a machine for cutting mortises in chairs, it is to be distinctly understood that the invention is not to be limited by the detailed disclosure, but is to be limited only as set forth in the appended claims.

An embodiment of the invention is shown in the accompanying drawings, in which

Figure 1 is a side elevation, partly in section, of the mortising machine.

Figure 2 is a sectional view on the line 2—2 of Figure 1.

Figure 3 is a sectional view on the line 3—3 of Figure 1.

Figure 4 is a view of a portion of the driving mechanism, such view corresponding to the section on the line 4—4 of Figure 1, the gearing and certain other portions being shown unsectioned.

Figure 5 is a detail view of one of the guides for the mortising tool shaft.

Figure 6 is a view of a further form of guide.

Figure 7 is a fragmentary view of the adjustable mounting for the table showing the protractor scale.

Figure 8 is a detail of one of the pivotal joints of the feeding levers.

Figure 9 is a detail of a further pivotal joint of the feeding levers and corresponding to a sectional view on the line 9—9 of Figure 10.

Figure 10 is a further detail of a pivotal joint of the feeding levers.

Figure 11 is a detail of the adjustable crank for oscillating the mortising tool.

Figure 12 is a plan view of the table showing the guides and clamps and a chair seat in position.

Figure 13 is a sectional view on the line 13—13 of Figure 12.

Figure 14 is a sectional view on the line 14—14 of Figure 12.

Figure 15 is a detail view of one of the guide tracks, such view corresponding to a section on the line 15—15 of Figure 12.

Figure 16 is a sectional view on the line 16—16 of Figure 12.

Figure 17 is a sectional view on the line 17—17 of Figure 12.

Figure 19 is a sectional view on the line 19—19 of Figure 18.

Figure 20 is a detail of the clamp shown in Figure 18.

Figure 21 is a section on the line 21—21 of Figure 20.

Figure 18:
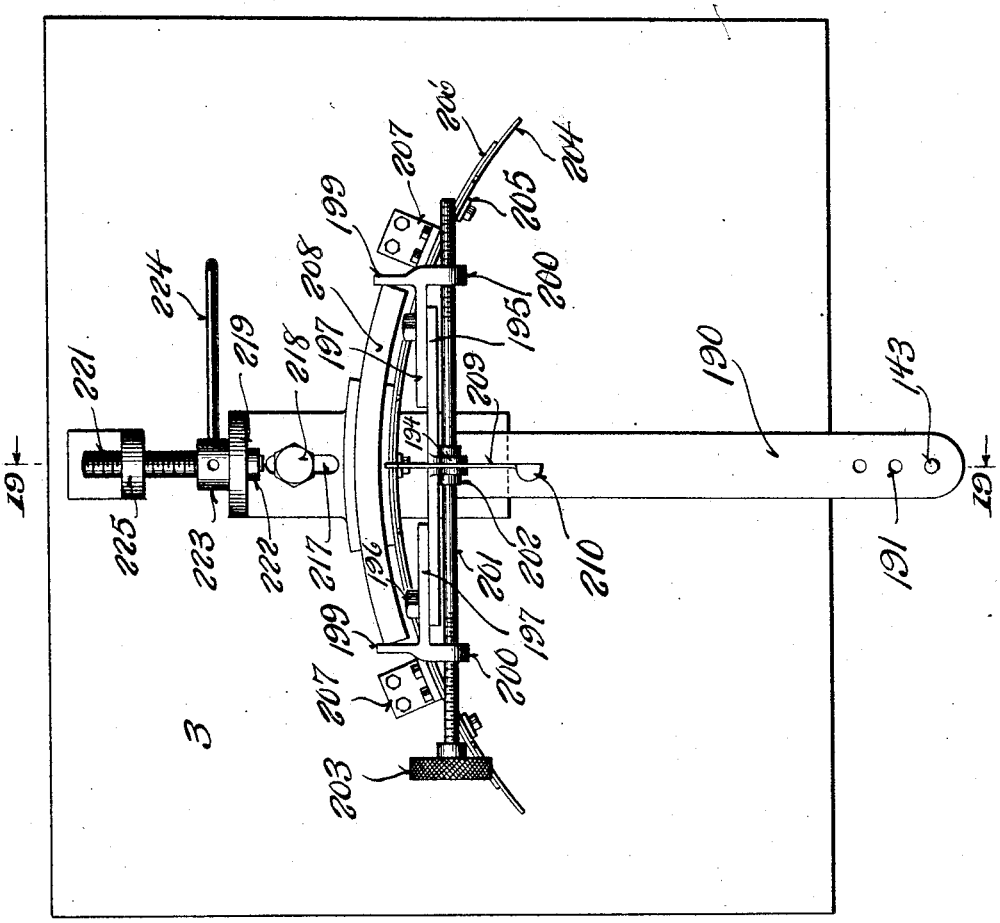
Figure 18 is a plan view of the table showing the clamps and guide track which are adapted for handling other forms of work, such for instance, as the tops of chair backs.

The mortising machine chosen for illustration is particularly adapted for the manufacture of chairs. It is designed to employ a revoluble cutter 1 of any suitable form which is adapted to be projected upwardly and laterally oscillated thru an aperture 2 in table 3 which receives the work upon its upper face. The table 3 is adjustably carried and supported from the hollow standard 4 of the machine. The cutter 1 is carried in a chuck carried by the upper end 5 of an upwardly projecting shaft 6, such shaft being conveniently provided with flattened wrench receiving faces 7, whereby it may be held while the locking nut 8 of the chuck is adjusted. The shaft 6 is carried within a hollow housing 9, to whose upper end a sleeve 10 is threaded, and to whose lower end a sleeve 11 integrally formed with an open casing 12 is also threaded. This shaft is carried in suitable bushings, two of which are shown as indicated at 13 and 14, and, as is well understood, may be bushed adjacent its upper end to provide suitable bearings. It is equipped with a crowned and flanged pulley 15 positioned within the open casing 12, and is supported by any suitable form of thrust bearing, as, for instance, that shown in Figure 1, and comprising a hardened plug 16, a ball 17 and a hardened cup 18, suitably housed within a cap 19 carried by the lower end of the casing and locked in position by means of the lock nut 20.

The shaft is driven by means of a belt 21 extending thru the hollow casing 12 and around the crowned pulley 15, and thru the hollow standard 4 of the machine. Upon the opposite side of the standard, a relatively large pulley 22 drives the belt 21 and is rigidly mounted upon a shaft 23 carried in suitable bearings 24 supported from the housing. A smaller driven pulley 25 is rigidly mounted upon the shaft 23 and is driven by means of the belt 26 from any suitable source of power.

The shaft 6 is mounted for universal motion adjacent its lower end, and the means for securing this motion may comprise trunnions 27 projecting laterally from the hollow casing 12, and carried within forked arms 28, such forked arms being pivotally supported within a bearing 29 of a bracket 30. The inner face of the bracket 30 is bolted to the feeding plate 31, such plate having an arcuate outer edge 32, and an apertured rear tongue 33, pivotally mounted upon a bolt, or screw, 34, screwed into the hollow standard 4. The forward, or arcuate, portion of the plate, is carried between a guide 35 integrally formed with the standard 4 and an overhanging guide 36 bolted to said standard to thereby limit the lateral play of the plate while permitting its pivotal motion about the screw 34.

The feeding means for rocking the pivotally mounted plate 31 will be hereinafter described.

The means for laterally oscillating the cutter, may comprise a crank pin 37, carried by a traveling block 38, dove-tailed within a corresponding slot 39 formed in the crank plate 40. The construction of this crank pin and block are clearly illustrated in Figures 1, 4 and 11, and it will be seen that the crank pin 37 is provided with a bushing 41 equipped with an outwardly extending inner flange 42, adapted to seat upon the rear face of the crank plate 40, and to be clamped in position by means of a nut 43 threaded upon the upper end of the crank pin 37, as will be clearly understood upon reference to Figures 4 and 11. The position of the crank pin with reference to the center of the crank plate and consequently the adjustment of the throw or lateral swing of the cutter, may be accurately secured by means of a threaded stem 44, whose outer end is provided with a flange 45 and an adjusting member 46, positioned upon opposite sides of a web 47 integral with the crank plate 40, as may be seen from Figure 4. A scale 38$^a$ may be secured to the face of the crank disc 40, and a cooperating pointer 38$^b$ may be formed upon the block 38 to indicate the adjustment of the crank pin with reference to the center of the crank plate, as shown in Figure 1.

The crank pin is connected with the sleeve 10 (see Figure 1) by means of a composite pitman comprising a member 48 pivotally mounted upon the bushing 41 and provided with forked ears, between which a rod 49 is pivotally mounted. This rod is pinned to a block 50 which is provided with a threaded aperture 51 in its forward end, adapted to be closed by a threaded plug 52. The enlarged end 53 of a rod 54 is held between the plug 52 and the block 50 so as to prevent axial movement and to allow rotary relative movement between the rod 54 and the block 50. The forward end of the rod 54 terminates in a forked extension 55 which is pivoted by means of screws 56 to the sleeve 10. It is to be noted at this point that the sleeve 10 is so connected with the crank pin as to allow the shaft 6 to swing angularly in any desired direction without producing any binding or straining of the pitman.

The means for rotating the crank plate 40 may comprise a horizontal shaft 57 pinned or otherwise secured to the crank plate and provided with a relatively large gear 58. A second horizontal shaft 59 carries a smaller gear 60 in mesh with the gear 58, and is provided with a set of cone pulleys 61 which are adapted to receive a driving belt 62. The shaft 57 is further provided with cone pulleys 63 which are connected with a third set of cone pulleys 64 by means of a belt 65. This last set of cone pulleys is carried upon a shaft 66, upon which is rigidly secured, a pinion 67. A fourth shaft 68 carries a relatively large gear 69 loosely thereon, to which gear one member 70 of a clutch is secured, the other member 71 of such clutch being loosely splined upon the shaft 68. The outer end of the shaft 68 carries a cam 72 whose purpose will hereinafter be described. The cam 72 is one in which the radius gradually increases. The shafts 59, 57 and 68 may conveniently be carried in bearings formed in brackets 73 bolted to the rear face of the machine, and the shaft 66 may similarly be carried in bearings formed in brackets 74 mounted below the bracket 73, as may be seen from Figures 1 and 3.

The means for advancing the feeding plate 31 comprises a feeding lever 75 pivotally mounted upon a screw 76 carried by the frame 4. The rear end of the feeding lever 75 is provided with a cam follower roller 77, which cooperates with the cam 72 when such cam is rotated. The forward end of the lever 75 is provided with an elongated slot 78, within which is mounted the enlarged portion 79, (see Figure 8) of a screw provided with a head 80 and with a threaded extension 81. The intermediate portion of this screw, or pivot pin, is provided with a squared portion 82 which is adapted to slide within an elongated slot 83 formed in the adjusting lever 84 of the feeding mechanism. It is held in any adjusted position by means of a nut 85 which clamps the lever 84 between the washer 86 and the shoulder formed by the enlarged portion 79, as will be apparent from reference to Figure 8. This adjusting lever 84 is pivotally mounted upon a pin 87 secured within a boss 88 of the standard 4 and pinned in place, as indicated at 89. This pin has a threaded extension upon which a nut 90 and washer 91 are positioned. This pin 87 is provided with an enlarged portion 88 forming shoulders adapted to seat against the outer surface of the boss 88 and against the washer 91, so as to permit the lever 84 to freely pivot about the enlarged portion. An aperture 92 is formed thru the enlarged portion, and is provided with rounded faces as may be seen from Figure 9. Thru this aperture a spindle 93 freely passes, such spindle being provided with an adjusting knurled disk 94 upon its outer end and having its inner end threaded, as indicated at 95. This threaded inner end cooperates with a threaded aperture formed in squared portion 82 of the screw pivotally joining the levers 75 and 84. In this manner the point of operative connection between levers 75 and 84 may be varied so as to vary the throw of the lever 84. This lever 84 is connected with the feeding plate 31 by means of a composite pitman comprising enlarged end portions 96 and 97 connected respectively with the lever 84 and the plate 31, and joined by means of a spindle 98 having reversely threaded ends and provided with a knurled adjusting disk 99 intermediate its ends. This spindle may be provided with locking nuts, as shown in Figure 1, whereby inadvertent motion is avoided.

Attention is called to the fact that the pivot 34 of the feeding plate and the crank pin 37 are upon the same side of the shaft 6. These points control the angular position of the shaft as it is advanced upwardly. Obviously the pivot point 34 may be moved as far to the right (see Figure 1) as desired, or as found expedient to maintain the shaft when in its middle position substantially vertical in all positions during the feeding operation. In this manner, the continuously oscillating shaft will rock back and forth thru an angle whose center line is at all times approximately vertical.

It will be seen from the mechanism thus described that the initial adjustment of the cutter with reference to the table top may be secured by turning the knurled disk 99, and that thereafter the desired throw may be secured by adjusting the knurled disk 94, subsequently tightening the nut 85 (see Figures 1 and 8).

The clutch for throwing the cam into operation may be manipulated by means of a lever 100 pivotally mounted at 101 to a bracket 102 upon the inner side of the casing 4, and provided at one end with a forked extension 103 loosely fitting within a groove formed in the movable splined member 71 of the clutch. The outer end of the lever is provided with a curved plate 104 adapted to be engaged by the knee of the operator. A spring 105 is joined to the lever intermediate the pivotal point 101 and the plate 104, and to the casing 4, as may be seen from Figure 3, and urges the clutch into open position. When, however, the clutch is forced into closed position, the frictional engagement of the teeth will be sufficient to hold it in engagement and to operate the feeding mechanism by depressing the rear end of the lever 75 and elevating the inner end of the lever 84 and consequently the feeding disk 31. However, when the roller 77 snaps over the projecting portion of the cam 72, the frictional engagement of the teeth, due to the driving of the spiral cam, is relieved and the spring 105 quickly opens the clutch.

The means for guiding the cutter in its lateral or oscillatory motion, comprises interchangeable guides which may be of rectangular formation, as illustrated in Figure 5, or curved contour, as illustrated in Figure 6. These guides may comprise a rear elongated plate 106 provided with forwardly projecting arms 107, to which a forward plate 108 is clamped by means of winged nuts 109. These clamps are provided with trunnions 110 which are carried in bearing, one-half of which are formed in brackets 111 (see Figure 2) carried by the standard 4 and the other half of which are formed in caps 112 pivoted at 113 to the brackets 111. These caps may be provided with clamping bolts 113', pivoted as indicated at 114 thereto, and adapted to enter slots 115 formed in the brackets 111 so as to permit ready removal of these guides. It is contemplated providing the sleeve 10 (see Figures 1, 5 and 6) with a roller sleeve 116, which is positioned between the plates 106 and 108 of the guides, so as to minimize friction. It is to be noted that the sleeve 10 does not rotate. This sleeve carries adjacent its upper end, a trough 117 for the shavings of the cutter, such trough being conveniently slanted downwardly at one end to guide the shavings to any desired point. In Figure 6, the guides 106ᵃ and 108ᵇ are curved or arcuate, so as to form a correspondingly arcuate mortise when desired.

From the mechanism thus far described, it will be seen that the cutter 1 is continuously rapidly rotated and oscillated, the roller 116 freely traveling within the guides. The pivotal and swiveled formation of the composite pitman formed of the members 49, 50 and 54, permits the use of any form of guide,—the guides due to their pivotal mounting permitting the relatively slight inner or outer swing of the device. It will also be seen that the cutter remains in its lowest position, as shown in Figure 1, and oscillates back and forth in this position until the face plate 104 is forced sidewise by the workman's knee. When this occurs, the clutch members 70—71 engage, and the cam 72 is relatively slowly rotated, thereby gradually projecting the cutter into the work, the machine automatically ceasing to cut and the feeding mechanism returning to its initial position at the completion of each mortise, as previously described.

The table 3 is adapted to be set horizontally or at any desired angle, and may conveniently be provided with arcuate laterally projected guiding ribs 118 which are slidably carried in similarly shaped slots 119 formed in brackets 120 clamped around the corners of the standard 4, as may be seen from Figures 1, 2 and 7. A screw 121 is passed thru an arcuate slot 122 formed in the face of the brackets 120 and is threaded into the semicircular plate 123, which latter plate is integral with the ribs 118. This plate is provided with inwardly projecting arms or lugs 124, which are secured by means of bolts 125 to the under side of the table 3. If desired the table may be provided with a throat plate 126, within which the aperture 2 is formed. If desired, a suitable protractor scale, as indicated at 127, may be formed upon the arcuate ribs 118 at either or both sides of a table top to indicate the annular seating of the table.

In order to provide for the accurate adjustment and the firm support of the table, a rod 128 is swivelled within a member 129 pivotally mounted between brackets 130 carried from the underside of the table. This rod may be provided with a hand wheel 131 intermediate its ends and with a threaded lower portion 132, which is screwed into a sleeve 133 pivotally mounted between the lugs 134 of a bracket 135, bolted upon the outer face of the standard 4. A locking nut, which may conveniently be in the form of a knurled disk 136, may be threaded upon the portion 132 to lock the rod 128 in any desired position of adjustment.

In machines of this type it is necessary to provide means for holding the work to the table. This is readily accomplished by means of the clamps and guide track hereinafter to be described, and in the particular machine illustrated, two sets of clamps have been provided for respectively holding a chair seat and the top of a chair back in position upon the table. Figures 12 to 17 inclusive, illustrate one form of clamping and guiding means for a chair seat. It will be seen, upon reference to these figures, that the table top 3 (see Figure 16) is provided with a channel shaped bracket 137 upon its underside, thru which a strap 138 loosely slides, a set screw 139 being provided to clamp this strap in any desired position. The strap, or bar, 138, (see Figure 13) projects outwardly beyond the edge of the table and thru a slot 140 in its side flange. At its outer end the strap is provided with an opening thru which a bolt 141 is passed. The upper portion of the bolt carries a spacer 142 and projects upwardly beyond the upper end of the spacer, being conveniently provided with a rounded terminal 143. A second bar, or strap, 144 is provided with a plurality of apertures 145, anyone of which is adapted to engage the bolt 141, the rounded head 143 thereof facilitating the entering of the bolt within these apertures. This strap 144 extends transversely across the table top, and is provided with an upwardly extending portion 146, and a substantially horizonal portion 147, such latter portion being adapted to ride upon an arcuate track 148 hereinafter to be described in greater detail. The strap 144 is provided with an elongated slot 149, thru which a bolt 150 provided with a suitable nut is passed. This bolt also passes thru a cross strap 151 and secures the strap rigidly in adjusted position with reference to the strap 144, such latter strap 151 being provided with downturned lugs 152, (see Figure 16), which engage the side margins of the bar 144, and maintains the strap 151 at right angles to such bar. The strap, or bar, 151 is provided with a downwardly extending lug 153, and with an elongated slot 154. A bracket provided with an angular portion 155 and with spaced lugs 156, is adjustably secured upon the bar 151 by means of a bolt 157 passed thru the slot 154 and into the bracket—the lugs 156 serving to maintain the bracket in correct relation to the bar 151, as will be readily understood. The lug 153 and the portion 155 are adapted to abut the outer face and the side face of the chair seat 158 to thereby accurately position the corner and consequently the entire seat with reference to the bars 154 and 151.

The gripping portion of this clamping mechanism comprises a bar 159 whose central portion 160 is riveted to the bar 144. A pair of clamping members 161 are slotted, as indicated at 162, to receive the outer ends of the bar 159 (see Figure 14), and to thereby slidably engage such bar. These members 161 are provided with gripping jaws 163 adapted to engage opposite sides of the chair seat 158. They are drawn towards each other by means of a spindle having oppositely threaded portions 164 and 165, threadably engaging upstanding lugs 166 and 167 of the members 161. The central portion of this reversely threaded spindle is provided with a knurled operating disk 168 which may be conveniently guided by means of a pair of lugs 169 extending upwardly from the central portion 160 of the transverse bar, as may be seen from Figures 13 and 14.

A relatively stationary clamp is mounted upon the table and comprises a supporting lug 170 which may be bolted to the table top and which is provided with a pivotally joined lever 171 spring pressed upwardly by means of the helical spring 172. A threaded pin 173 is passed thru the spring 172 and securely bolted in position by means of a reduced extension 174 passed thru the table top and a clamping nut 175. This pin passes thru a fairly large aperture formed in the lever 171, and is provided with a clamping nut 176, provided with a plurality of holes, into anyone of which a manipulating pin 177 may be screwed. The outer or free end of this clamping lever 171 is provided with a rounded face 178 adapted to engage the edge of the chair seat 158 at a point above the throat plate 126 and closely adjacent the opening 2 to thereby securely hold the work at the point where it is subjected to greatest stress.

It is frequently the case that a plurality of regularly spaced mortises are needed in a chair seat, and it is desirable therefore, to provide guides for readily adjusting the chair seat and holding it in its successive positions so that these mortises may be quickly formed. This is readily secured by means of the arcuate track 148 which is provided with a plurality of notches 179 spaced at the desired points throughout its length. This track is backed by an arcuate reinforcing member 180, and is secured thereto at a plurality of points by means of the brackets 181 which are clamped in position by the screws 182. This backing strip is held in position by means of angular brackets 183, bolted to the table top and to said backing strip, as may be seen from Figures 12 and 15.

A lever 184 is pivotally carried between lugs 185, of a bracket 186 bolted to the horizontal portion 147 of the bar 144, (see Figures 12, 13 and 14). This lever is provided with a laterally projecting end 187 which is adapted to engage anyone of the notches 179, and at its other end, is provided with a thumb piece 188 by which it may be released. One of the brackets 185 extends upwardly and sidewise, and carries a spring 189 which urges the portion 187 of the lever into engagement with the notches.

It is therefore apparent that the chair seat 158 may be readily positioned by means of the lug 153 and portion 155 of the corner guide, and may be quickly clamped in position by the jaws 163—the fit between the bar 144 and the pin 141 being relatively loose and permitting the clamping mechanism to be slightly raised to permit the insertion of a chair seat therebeneath. After the clamps 163 have been tightened and the mechanism moved until the transverse portion 187 of the lever snaps into the appropriate notch 179, the clamping lever 171 is tightened by means of the arm 177, and a mortise is then quickly cut in the correct position. Thereafter the clamp 171 is loosened, the thumb piece 188 depressed and the chair seat, while still clamped between the members 163, is rocked about the pin 141 until the lateral portion 187 of the lever snaps into the next notch, at which time the clamping lever 171 is again locked down upon the chair seat and a second mortise cut. In this manner a succession of correctly spaced mortises may be formed with the greatest of rapidity, and successive chair seats may be substituted with the utmost facility.

The means for clamping a chair back top are shown in Figures 18 to 21 inclusive, which will now be described. A bar 190 replaces the bar 144 and is similarly provided with a plurality of spaced apertures 191 adapted to engage the pin 141. The inner end of this bar is upturned, as indicated at 192, and is provided with a pair of lugs 193 having upstanding portions 194. It is further provided with laterally extending arms 195, into which bolts 196 are screwed. A pair of clamps 197 are slidably related to these laterally extending arms 195, and are provided with elongated slots 198 which receive the stems of the bolts 196. These clamping members are provided with clamping jaws 199 and with lugs 200 into which the reversely threaded ends of a spindle 201 are screwed, the spindle being provided with collars 202 upon opposite sides of the lugs 193 and being further provided with an external manipulating knurled disk 203.

A notched track 204 held in position by clamping brackets 205, a backing strip 206, and supporting brackets 207, in a manner similar to that previously described, is provided for positioning the chair back top 208 at successive points for the mortises. A lever 209 provided with a thumb piece 210 and a free locking end 211, is urged into locking position by means of a spring 212, so as to lock the chair back top in any desired position of adjustment so that the successive mortises may be formed at the correct spacings.

A relatively stationary clamp is provided for engaging the chair back top and comprises a member 213 having an elongated slot 214 thru which a bolt 215 screwed into the table top 3 is passed to lock this member in its correct position. A second somewhat similar member 216 is provided with an elongated slot 217 which loosely engages a guide bolt stem 218 and is further provided with an upstanding rear portion 219. This rear portion receives the stem 220 of an adjusting screw 221, such stem being provided with an external collar 222 and with an enlarged head 223 upon opposite sides of the upstanding portion 219. The portion 223 is adapted to receive an adjusting rod 224 (see Figures 18 and 19). The threaded portion 221 screws into a lug 225 which is rigidly locked to the table top by means of a bolt 226 and nut 227.

After a chair back top has been clamped in position by the jaws 199, the movable clamping mechanism is rocked about the pivot pin 141 until the lever 209 cooperates with a notch in the track to lock the back in correct position. Thereafter the manipulating rod or handle 224 is rocked to clamp the chair back top between the jaws 228 and 229 of the members 213 and 216. When it is desired to form the next mortise, it is merely necessary to release the jaw 229 of the relatively stationary clamp and depress the thumb portion 210 of the lever 209, thereafter allowing the lever to snap into the next notch as the movable clamp, together with the chair back top, is rotated about the pivot pin 141.

It will be seen that a mortise machine has been provided which is adapted to form successive mortises at correctly spaced points within a piece of work in a rapid and efficacious manner. It will also be seen that a machine has been provided which automatically stops after the formation of each mortise, which automatically feeds the tool into the work and which operates in an extremely rapid manner.

It will further be seen that means have been provided for quickly clamping the work in adjusted position and permitting its repositioning for successive mortises in an extremely simple and easily controlled manner.

I claim:

1. A mortising machine comprising a revolubly mounted shaft having a cutter-carrying end, means for rotating said shaft, a housing for said shaft, a support having a universal connection with said housing at a point remote from the cutter-carrying end of said shaft, and mechanism for oscillating said housing laterally and longitudinally of said machine.

2. A mortising machine comprising a movably mounted cutter-carrying member, means for operating said member, a supporting housing for said member, a feed plate, a pivotal connection between said feed plate and housing, a cam and lever mechanism operatively connecting said feed plate and cam, whereby when said cam is rotated said cutter carrying member is advanced and returned to its initial position.

3. A mortising machine comprising a movably mounted cutter-carrying member, means for operating said member, a supporting housing for said member, a feed plate, a pivotal connection between said feed plate and housing, a cam, lever mechanism operatively connecting said feed plate and cam, whereby when said cam is rotated, said cutter carrying member is advanced and returned to its initial position, and means for automatically stopping said cam after one complete cycle.

4. A mortising machine comprising a revolubly mounted shaft having a cutter-carrying end, means for rotating said shaft, a housing for said shaft, a support having a universal connection with said housing at a point remote from the cutter-carrying end of said shaft, means for oscillating said housing, and a removable guide for said housing adjacent the cutter-carrying end of said shaft.

5. A mortising machine comprising a revolubly mounted shaft having an outer cutter-carrying end, means for rotating said shaft, a housing for said shaft, a supporting member having a universal connection with said housing adjacent the inner end of said shaft, means for oscillating said housing about its universal connection with said supporting member, and a pivoted guide for said housing adjacent the outer end of said shaft.

6. A mortising machine comprising a revolubly mounted shaft having a cutter-carrying end, means for rotating said shaft, a housing for said shaft, a feed plate having a universal connection with said housing, means for oscillating said housing about its universal connection with said feed plate, a guide for said housing adjacent the cutter-carrying end of said shaft, and means for automatically advancing said feed plate and returning it to its initial position.

7. A mortising machine comprising a revolubly mounted shaft having a cutter-carrying end, means for rotating said shaft, a housing for said shaft, a feed plate having a universal connection with said housing, means for oscillating said housing about its universal connection with said feed plate, a guide for said housing adjacent the cutter-carrying end of said shaft, means for automatically advancing said feed plate and returning it to its initial position, and means for stopping said feed plate after a complete cycle of movements.

8. A mortising machine comprising a revolubly mounted shaft having a cutter-carrying end, means for rotating said shaft, a housing for said shaft, a pivotally mounted feed plate having a universal connection with said housing, means for oscillating and guiding said housing, a driving shaft, a cam, an automatically opening clutch for connecting said cam and shaft and adapted to open after a complete cycle of operations, manual means for initially closing said clutch, and lever mechanism operatively connecting said cam and feed plate, whereby said feed plate is rocked about its pivot to advance the cutter carrying shaft and returned to its initial position and automatically stopped after each complete cycle of operations.

9. A mortising machine comprising a revolubly mounted shaft having a cutter-carrying end, means for rotating said shaft, a housing for said shaft, a pivotally mounted feed plate having a universal connection with said housing, means for oscillating and guiding said housing, a driving shaft, a cam, an automatically opening clutch for connecting said cam and shaft and adapted to open after a complete cycle of operations, manual means for initially closing said clutch, and an adjustable compound lever mechanism operatively coupling said cam and plate with a variable motion magnifying ratio.

10. In a mortising machine the combination of a table having an opening therethrough, a mortising tool adapted to pass through said opening, means for operating said tool, a work clamp, means pivotally joining said work clamp to said table, and a second and relatively stationary clamp for locking the work to the table.

11. In a machine for operating upon work the combination of a table, a work clamp having a pair of jaws, means for drawing said jaws toward each other into gripping engagement with the work, means for pivotally joining said clamp to said table, an arcuate track mounted upon said table, and a member extending from said clamps and resting upon said track.

12. In a machine for operating upon work the combination of a table, a work clamp having a pair of jaws, means for forcing the jaws into gripping engagement with the work, a guiding track carried by said table and having a plurality of stops, and releasable means carried by said clamp and cooperating with said stops to definitely locate the work in successive positions.

13. In a mortising machine the combination of a table having an opening therethrough, a mortising tool adapted to pass through said opening, means for operating said tool, a work clamp, a track carried by said table and having a plurality of spaced notches therein, means carried by the work clamp and adapted to enter any one of said notches to position the successive portions of the work over said opening, and a clamp carried by said table and adapted to temporarily clamp the portion of the work adjacent said opening to said table.

14. In a mortising machine the combination of a table having an opening therethrough, a mortising tool adapted to pass through said opening, mechanism for operating said tool, means pivotally mounted upon said table for positioning and clamping said work, a track for said means and having a plurality of notches at spaced points along its extent, a spring pressed finger carried by said means and adapted to enter any of said notches to temporarily position the work, and a second clamp carried by said table and adapted to lock the work to said table at a point adjacent said opening.

In testimony that I claim the foregoing I have hereunto set my hand at Sheboygan, in the county of Sheboygan and State of Wisconsin.

WILLIAM LOEFFLER.